(12) United States Patent
Sunkavalli et al.

(10) Patent No.: US 10,659,437 B1
(45) Date of Patent: May 19, 2020

(54) CRYPTOGRAPHIC SYSTEM

(71) Applicant: Xilinx, Inc., San Jose, CA (US)

(72) Inventors: Ravi Sunkavalli, San Jose, CA (US);
Anujan Varma, Cupertino, CA (US);
Chuan Cheng Pan, San Jose, CA (US);
Patrick C. McCarthy, San Francisco, CA (US); Hanh Hoang, Hayward, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/144,705

(22) Filed: Sep. 27, 2018

(51) Int. Cl.
*H04L 29/06* (2006.01)
(52) U.S. Cl.
CPC .......... *H04L 63/0428* (2013.01); *H04L 63/08* (2013.01); *H04L 63/0823* (2013.01); *H04L 63/164* (2013.01); *H04L 63/166* (2013.01)
(58) Field of Classification Search
USPC .......................................................... 713/175
See application file for complete search history.

(56) References Cited

U.S. PATENT DOCUMENTS

| | | | |
|---|---|---|---|
| 6,118,869 A | 9/2000 | Kelem | |
| 6,351,814 B1 * | 2/2002 | Batinic | G06F 21/76 380/264 |
| 6,794,896 B1 | 9/2004 | Brebner | |
| 7,010,664 B1 | 3/2006 | Ballagh | |
| 7,180,776 B1 | 2/2007 | Wennekamp | |
| 7,424,553 B1 | 9/2008 | Borrelli | |
| 7,536,559 B1 | 5/2009 | Jenkins | |
| 7,757,294 B1 | 7/2010 | Simkins | |
| 7,853,799 B1 | 12/2010 | Trimberger | |
| 7,958,414 B1 | 6/2011 | Ansari | |
| 8,074,077 B1 | 12/2011 | Neema | |
| 8,284,801 B1 | 10/2012 | Vashi | |

(Continued)

OTHER PUBLICATIONS

Rahimunnisa, K. et al., "PSP: Parallel sub-pipeline architecture for high throughput AES on FPGA and ASIC," Central European Journal of Computer Science, Dec. 2013, vol. 3, Issue 4, pp. 173-186, Springer Link, https://link.springer.com/.

(Continued)

*Primary Examiner* — Amare F Tabor
(74) *Attorney, Agent, or Firm* — Crawford Maunu PLLC (57) ABSTRACT

A circuit arrangement includes an encryption circuit and a decryption circuit. A cryptographic shell circuit has a transmit channel and a receive channel in parallel with the transmit channel. The transmit channel includes an encryption interface circuit coupled to the encryption circuit. The encryption interface circuit determines first cryptographic parameters based on data in a plaintext input packet and inputs the first cryptographic parameters and plaintext input packet to the encryption circuit. The receive channel includes a decryption interface circuit coupled to the decryption circuit. The decryption interface circuit determines second cryptographic parameters based on data in a ciphertext input packet and inputs the second cryptographic parameters and ciphertext input packet to the decryption circuit. The encryption circuit encrypts the plaintext input packet based on the first cryptographic parameters, and the decryption circuit decrypts the ciphertext input packet based on the second cryptographic parameters.

20 Claims, 6 Drawing Sheets

(56) References Cited

U.S. PATENT DOCUMENTS

| | | | |
|---|---|---|---|
| 8,452,985 B2 * | 5/2013 | Matsuzaki | H04L 9/0891 |
| | | | 713/191 |
| 8,539,254 B1 | 9/2013 | Bridgford | |
| 8,713,327 B1 | 4/2014 | Peterson | |
| 8,966,253 B1 | 2/2015 | Trimberger | |
| 8,981,810 B1 | 3/2015 | Trimberger | |
| 9,047,474 B1 | 6/2015 | Ahmad | |
| 9,755,649 B1 | 9/2017 | Singhal | |
| 9,760,502 B2 * | 9/2017 | Raam | G06F 21/606 |
| 9,934,185 B2 | 4/2018 | Arbel | |
| 9,941,880 B1 | 4/2018 | Lesea | |
| 10,102,370 B2 * | 10/2018 | Narendra Trivedi | |
| | | | G06F 3/0604 |
| 2002/0166058 A1 * | 11/2002 | Fueki | G06F 21/85 |
| | | | 713/194 |
| 2005/0198531 A1 * | 9/2005 | Kaniz | H04L 63/0485 |
| | | | 726/5 |
| 2007/0113095 A1 * | 5/2007 | Marui | H04L 9/00 |
| | | | 713/178 |
| 2015/0195258 A1 * | 7/2015 | Kohiyama | G09C 1/00 |
| | | | 713/168 |
| 2017/0257369 A1 * | 9/2017 | Ito | G06F 21/105 |
| 2018/0053017 A1 * | 2/2018 | Shimizu | G06F 21/606 |

OTHER PUBLICATIONS

Henzen, Luca et al., "FPGA Parallel-Pipeline AES-GCM Core for 100G Ethernet Applications," Proc. of the 36th European Sold State Circuits Conference, Sep. 13, 2010, pp. 202-205, IEEE, Piscataway, New Jersey, USA.

* cited by examiner

CRYPTOGRAPHIC SYSTEM

TECHNICAL FIELD

The disclosure generally relates to systems for encrypting plaintext and decrypting ciphertext.

BACKGROUND

Field programmable gate arrays (FPGAs) are popular platforms for implementing cryptography functions in networking, storage, and blockchain applications, for example. FPGAs provide convenient software control and ease of adding and/or improving functions.

Though FPGAs can be advantageous for implementations of cryptography systems, FPGAs present design challenges. Implementations of cryptography functions can consume a large quantity of FPGA resources such as look-up tables (LUTs), flip-flops (FFs), and block random access memories (BRAMs). For example, a single media access control security function (MACsec) can consume approximately 100,000 LUTs, approximately 100,000 FFs, and approximately 100 BRAMs. The large quantity of FPGA resources can challenge the circuit designer in closing timing on the circuit design, depending on the target clock speed. To alleviate timing issues, extensive pipelining may be employed, which can lead to the implemented circuit consuming more power than is desirable.

SUMMARY

A disclosed circuit arrangement includes an encryption circuit and a decryption circuit. A cryptographic shell circuit has a transmit channel and a receive channel in parallel with the transmit channel. The transmit channel includes an encryption interface circuit coupled to the encryption circuit. The encryption interface circuit is configured to determine first cryptographic parameters based on data in a plaintext input packet and input the first cryptographic parameters and plaintext input packet to the encryption circuit. The receive channel includes a decryption interface circuit coupled to the decryption circuit. The decryption interface circuit is configured to determine second cryptographic parameters based on data in a ciphertext input packet and input the second cryptographic parameters and ciphertext input packet to the decryption circuit. The encryption circuit is configured to encrypt the plaintext input packet based on the first cryptographic parameters, and the decryption circuit is configured to decrypt the ciphertext input packet based on the second cryptographic parameters.

Another disclosed circuit arrangement includes an integrated circuit (IC) device. A plurality of pairs of encryption circuits and decryption circuits are disposed on the IC device. A plurality of cryptographic shell circuits are coupled to the plurality of pairs of encryption circuits and decryption circuits, respectively. Each cryptographic shell circuit has a transmit channel and a receive channel in parallel with the transmit channel. The transmit channel includes an encryption interface circuit coupled to the encryption circuit of the respective pair of encryption and decryption circuits. The encryption interface circuit is configured to determine first cryptographic parameters based on data in a plaintext input packet and input the first cryptographic parameters and plaintext input packet to the encryption circuit. The receive channel includes a decryption interface circuit coupled to the decryption circuit of the respective pair of encryption and decryption circuits. The decryption interface circuit is configured to determine second cryptographic parameters based on data in a ciphertext input packet and input the second cryptographic parameters and ciphertext input packet to the decryption circuit. The encryption circuit of the respective pair of encryption and decryption circuits is configured to encrypt the plaintext input packet based on the first cryptographic parameters, and the decryption circuit of the respective pair of encryption and decryption circuits is configured to decrypt the ciphertext input packet based on the second cryptographic parameters.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods employ hardwired cryptographic circuitry in combination with a reconfigurable cryptographic shell. The hardwired cryptographic circuitry is fixed and not reprogrammable, whereas the configurable cryptographic shell is reprogrammable. The functions of the hardwired cryptographic circuitry are fixed, and the functions of the cryptographic shell can be reprogrammed. The hardwired cryptographic circuitry can be implemented as application-specific circuitry, and the cryptographic shell can be implemented in programmable logic circuitry or as a processor executing program code. The hardwired cryptographic circuitry provides a fast and efficient implementation of encryption and decryption functions, and the reprogrammable/reconfigurable cryptographic shell provides a flexible implementation for different applications, such as MACsec, internet protocol (IPsec), and bulk cryptography.

The hardwired cryptographic circuit includes an encryption circuit and a decryption circuit, which provide parallel channels. The cryptographic shell circuit, which has a transmit channel and a receive channel in parallel with the transmit channel, is reconfigurable for implementing different security applications. The transmit channel includes an encryption interface circuit coupled to the encryption circuit. The encryption interface circuit is configured to determine a set of cryptographic parameters based on data in a plaintext input packet and input the set of cryptographic parameters and plaintext input packet to the encryption circuit. The receive channel includes a decryption interface circuit coupled to the decryption circuit. The decryption interface circuit is configured to determine another set of cryptographic parameters based on data in a ciphertext input packet and input the other set of cryptographic parameters and ciphertext input packet to the decryption circuit. The encryption circuit in the hardwired cryptographic circuit is configured to encrypt the plaintext input packet based on the set of cryptographic parameters provided on the transmit channel, and the decryption circuit is configured to decrypt the ciphertext input packet based on the set of cryptographic parameters provided on the receive channel.

Figure 1:
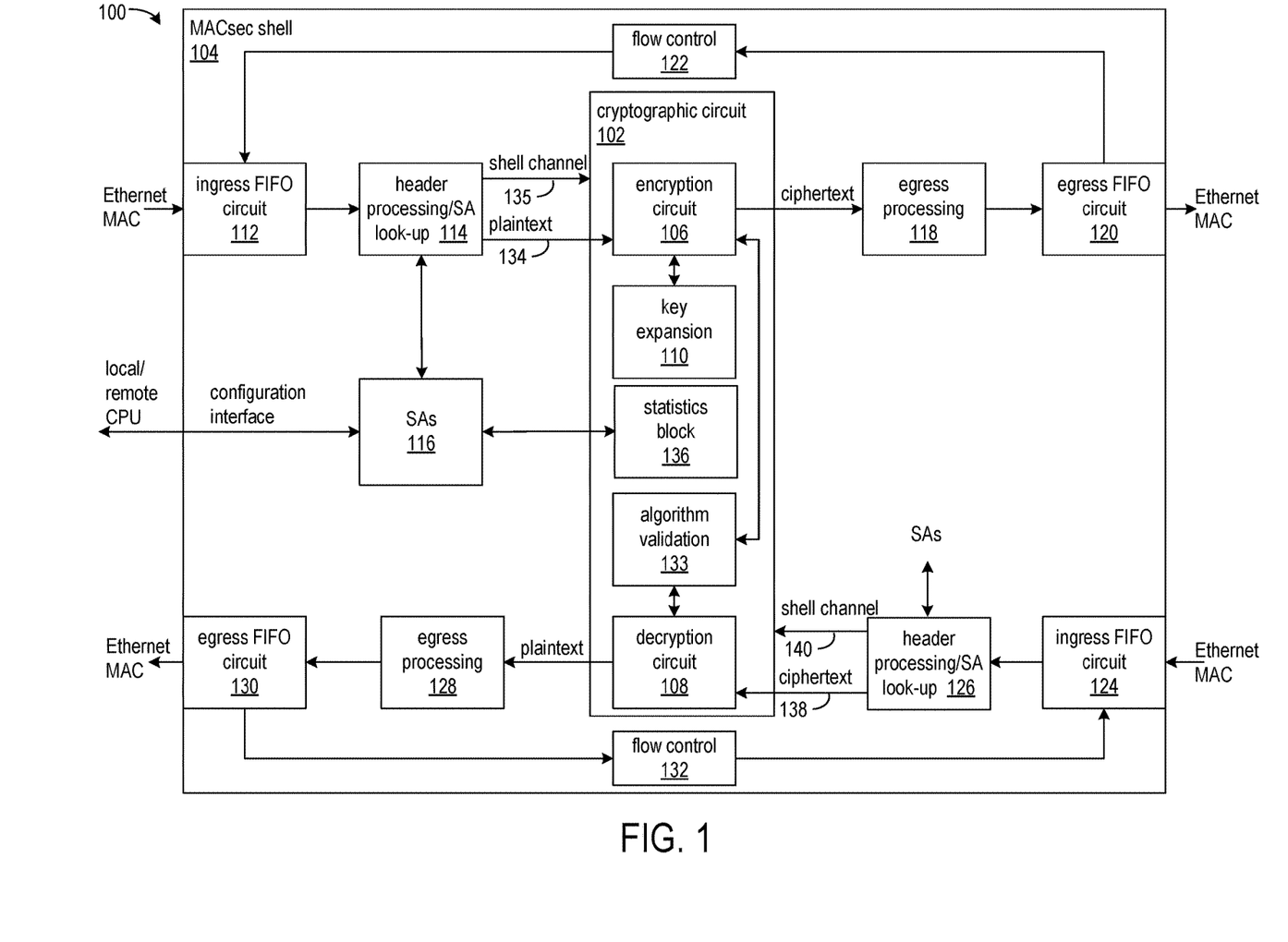
FIG. 1 shows a circuit arrangement according to an exemplary implementation for a MACsec application.

FIG. 1 shows a circuit arrangement 100 according to an exemplary implementation for a MACsec application. The circuit arrangement 100 includes a MACsec cryptographic shell circuit 104 that provides input and output interfaces to cryptographic circuit 102. The cryptographic circuit includes an encryption circuit 106, a decryption circuit 108, key expansion circuit 110, algorithm validation circuit 133, and statistics block 136. The encryption circuit encrypts plaintext data based on parameters input by the MACsec shell circuit 104. Similarly, the decryption circuit decrypts ciphertext data based on parameters input by the MACsec shell circuit. The encryption circuit can use recognized key expansion circuitry 110 in encrypting the plaintext data. The algorithm validation circuit performs testing of the encryption circuit and the decryption circuit to verify correct operation.

The MACsec shell circuit 104 implements parallel transmit and receive channels, supporting concurrent encryption and decryption activities. The transmit channel includes ingress first-in-first-out (FIFO) circuit 112, header processing/security association (SA) look-up circuit 114, egress processing circuit 118, egress FIFO circuit 120, and flow control circuit 122.

The ingress FIFO circuit 112 receives plaintext data consistent with the MAC protocol and transmitted over Ethernet, for example. The ingress FIFO circuit buffers input data in packet form for processing by the header processing/SA look-up circuit 114. The header processing/SA look-up circuit extracts parameters from the header of the packet and uses the parameters to look up the associated MACsec attributes and parameters in the memory circuit 116, which associatively stores MAC packet header parameters and SAs in the reconfigurable shell and enables scalable support on larger SA numbers. The extracted MAC packet header parameters include MAC-level Source Address, Port Number etc., and the associated attributes and parameters include SA index, cipher select, cipher-specific parameters, and MACsec-specific parameters. The cipher-select parameter can indicate AES-GCM-128b, AES-GCM-256b, or another cipher suite. Cipher-specific parameters can include nonce, initialization vector, etc., and MACsec-specific parameters can include the packet number, security channel number, etc.

The header processing/SA look-up circuit inputs plaintext data to the encryption circuit 106 on signal lines 134 and shell channel data on signal lines 135. The shell channel data includes the SA index, cipher-select parameter, and cipher-specific parameters. The encryption circuit encrypts the plaintext data according to the cipher-select parameter and cipher-specific parameters and outputs to the ciphertext to the egress processing circuit 118. The encryption circuit uses the SA index to select a key to be used in encrypting the input plaintext.

The egress processing circuit 118 computes and appends a new Frame Check Sequence for the encrypted packet, inserts any packet that bypass the encryption block into the data stream, and may also perform other transformations on the packet that are unrelated to MACsec.

Output data from the egress processing circuit 118 is provided to the egress FIFO circuit 120, which buffers the data before transmitting over an Ethernet channel. The egress FIFO circuit signals flow control circuit 122, which allows or backpressures input of ciphertext packets to the ingress FIFO circuit 112. For example, if the egress FIFO circuit is full, the flow control circuit 122 backpressures input to the ingress FIFO circuit 112 until space is available in the egress FIFO circuit 120.

The receive channel includes ingress FIFO circuit 124, header processing/SA look-up circuit 126, egress processing circuit 128, egress FIFO circuit 130, and flow control circuit 132.

The ingress FIFO circuit 124 receives ciphertext data consistent with the MAC protocol. The ingress ciphertext data can be transmitted over Ethernet, for example. The ingress FIFO circuit 124 buffers input data in packet form for processing by the header processing/SA look-up circuit 126. The header processing/SA look-up circuit 126 extracts parameters from the header of the packet and uses the parameters to look up the associated MACsec attributes and parameters in the memory circuit 116.

The header processing/SA look-up circuit 126 inputs ciphertext data to the decryption circuit 108 on signal lines 138 and shell channel data on signal lines 140. The shell channel data includes the SA index, cipher-select parameter, and cipher-specific parameters. The decryption circuit decrypts the ciphertext data according to the cipher-select parameter and cipher-specific parameters and outputs the plaintext data to the egress processing circuit 128.

The egress processing circuit 128 computes and appends a new Frame Check Sequence for the decrypted packet, inserts any packet that bypass the decryption block into the data stream, and may also perform other transformations on the packet that are unrelated to MACsec.

Output data from the egress processing circuit 128 is provided to the egress FIFO circuit 130, which buffers the data before transmitting over an Ethernet channel. The egress FIFO circuit 130 signals flow control circuit 132, which allows or backpressures input of plaintext packets to the ingress FIFO circuit 124. For example, if the egress FIFO circuit 130 is full, the flow control circuit 132 backpressures input to the ingress FIFO circuit 124 until space is available in the egress FIFO circuit 130.

The cryptographic shell circuit 104 further includes a configuration interface through which the SAs and associated attributes and parameters can be changed. The configuration interface can be implemented by an internal configuration access port in programmable logic devices or by a Joint Test Access Group (JTAG) scan interface, both of which are generally available. The configuration interface can also be connected to the statistics block 136 for reading accumulated operating statistics of the cryptographic circuit. The statistics block 136 accumulates statistical information related to operation of the encryption circuit 106 and the decryption circuit 108 and stores the information in the memory circuit 116. The statistical information can include counts of different SA input values and counts of security entities, and other data defined by the MACsec standard.

Figure 2:
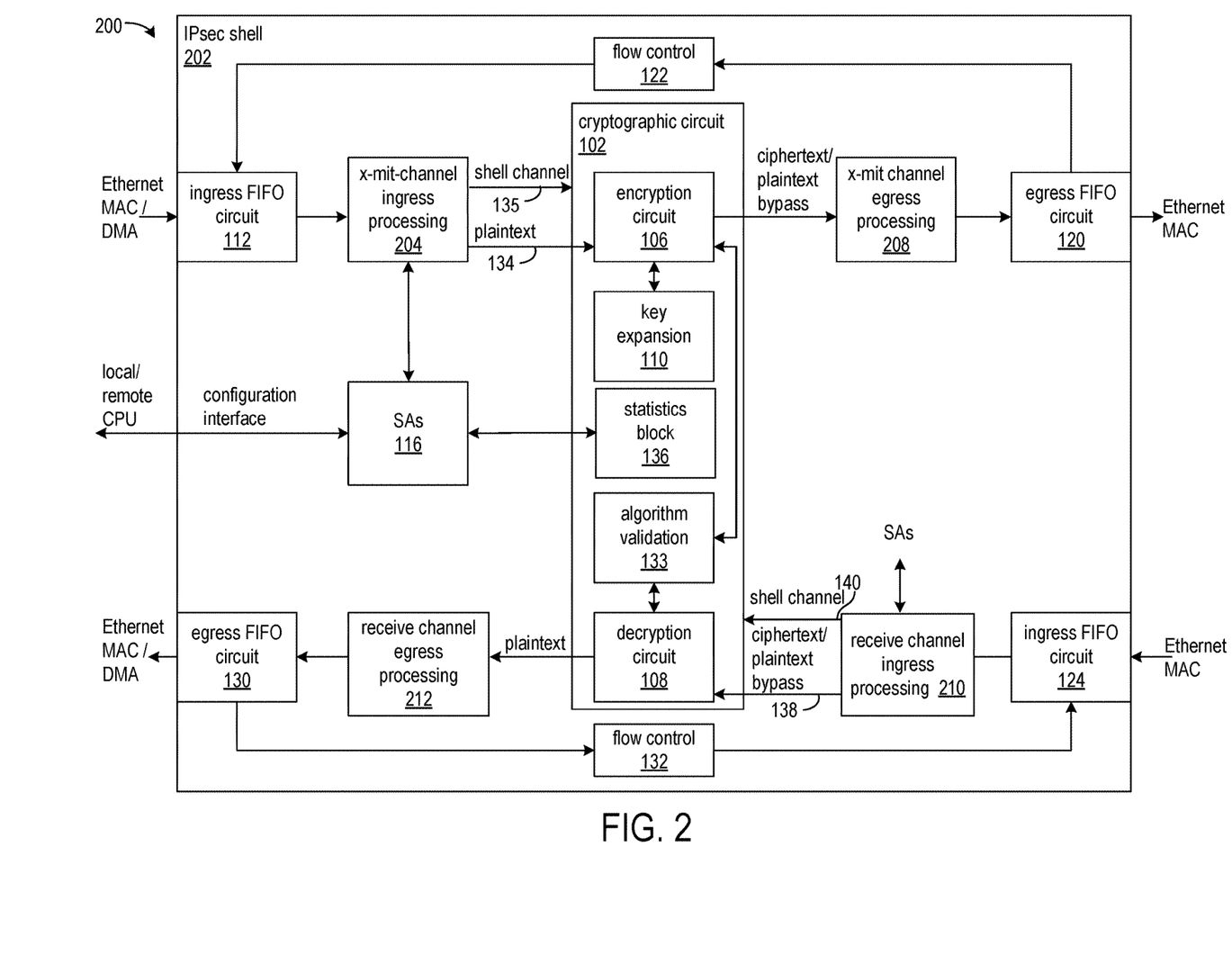
FIG. 2 shows a circuit arrangement according to an exemplary implementation for an IPsec application.

FIG. 2 shows a circuit arrangement 200 according to an exemplary implementation for an IPsec application. The circuit arrangement 200 includes an IPsec cryptographic shell circuit 202 that provides input and output interfaces to cryptographic circuit 102. The cryptographic circuit includes the sub-circuits shown in FIG. 1 and described above.

The IPsec shell circuit 202 implements parallel transmit and receive channels, supporting concurrent encryption and decryption activities. The transmit channel includes ingress first-in-first-out (FIFO) circuit 112, transmit channel ingress processing circuit 204, transmit channel egress processing circuit 208, egress FIFO circuit 120, and flow control circuit 122.

The ingress FIFO circuit 112 receives plaintext data consistent with direct memory access protocol or the MAC protocol and transmitted over Ethernet, for example. The ingress FIFO circuit buffers input data in packet form for processing by the transmit channel ingress processing circuit 204. The transmit channel ingress processing circuit extracts parameters from the header of the packet and uses the parameters to look up the associated IPsec attributes and parameters in the memory circuit 116, which associatively stores IP packet header parameters and SAs in the reconfigurable shell and enables scalable support on larger SA numbers. The extracted IP packet header parameters include IP-level Source Address, Destination Address etc., and the associated attributes and parameters include SA index, cipher select, cipher-specific parameters, and IPsec-specific parameters. The cipher-select parameter can indicate AES-GCM-128b, AES-GCM-256b, or another cipher suite. Cipher-specific parameters can include nonce, initialization vector, etc., and IPsec-specific parameters can include sequence number, security parameter index (SPI), etc.

The transmit channel ingress processing circuit 204 inputs plaintext data to the encryption circuit 106 on signal lines 134 and shell channel data on signal lines 135. The shell channel data includes the SA index, cipher-select parameter, and cipher-specific parameters. The encryption circuit encrypts the plaintext data according to the cipher-select parameter and cipher-specific parameters and outputs the ciphertext to the transmit channel egress processing circuit 208.

The transmit channel egress processing circuit 208 performs IPsec-specific processing, which can include inserting a new link header in the packet, replacing the current link header, incorporating buffers to capture packets for examination by software, or inserting packets into the encrypted data stream from software.

Output data from the transmit channel egress processing circuit 208 is provided to the egress FIFO circuit 120, which buffers the data before transmitting over an Ethernet channel. The egress FIFO circuit signals flow control circuit 122, which allows or backpressures input of ciphertext packets to the ingress FIFO circuit 112. For example, if the egress FIFO circuit is full, the flow control circuit 122 backpressures input to the ingress FIFO circuit 112 until space is available in the egress FIFO circuit 120.

The receive channel includes ingress FIFO circuit 124, receive channel ingress processing circuit 210, receive channel egress processing circuit 212, egress FIFO circuit 130, and flow control circuit 132.

The ingress FIFO circuit 124 receives ciphertext data consistent with the MAC protocol. The ingress ciphertext data can be transmitted over Ethernet, for example. The ingress FIFO circuit 124 buffers input data in packet form for processing by the receive channel ingress processing circuit 210. The receive channel ingress processing circuit 210 extracts parameters from the header of the packet and uses the parameters to look up the associated IPsec attributes and parameters in the memory circuit 116.

The receive channel ingress processing circuit 210 inputs ciphertext data to the decryption circuit 108 on signal lines 138 and shell channel data on signal lines 140. The shell channel data includes the SA index, cipher-select parameter, and cipher-specific parameters. The decryption circuit decrypts the ciphertext data according to the cipher-select parameter and cipher-specific parameters and outputs the plaintext data to the receive channel egress processing circuit 212.

The receive channel egress processing circuit 212 performs IPsec-specific processing as descried above.

Output data from the receive channel egress processing circuit 212 is provided to the egress FIFO circuit 130, which buffers the data before transmitting over DMA or an Ethernet channel. The egress FIFO circuit 130 signals flow control circuit 132, which allows or backpressures input of plaintext packets to the ingress FIFO circuit 124. For example, if the egress FIFO circuit 130 is full, the flow control circuit 132 backpressures input to the ingress FIFO circuit 124 until space is available in the egress FIFO circuit 130.

Figure 3:
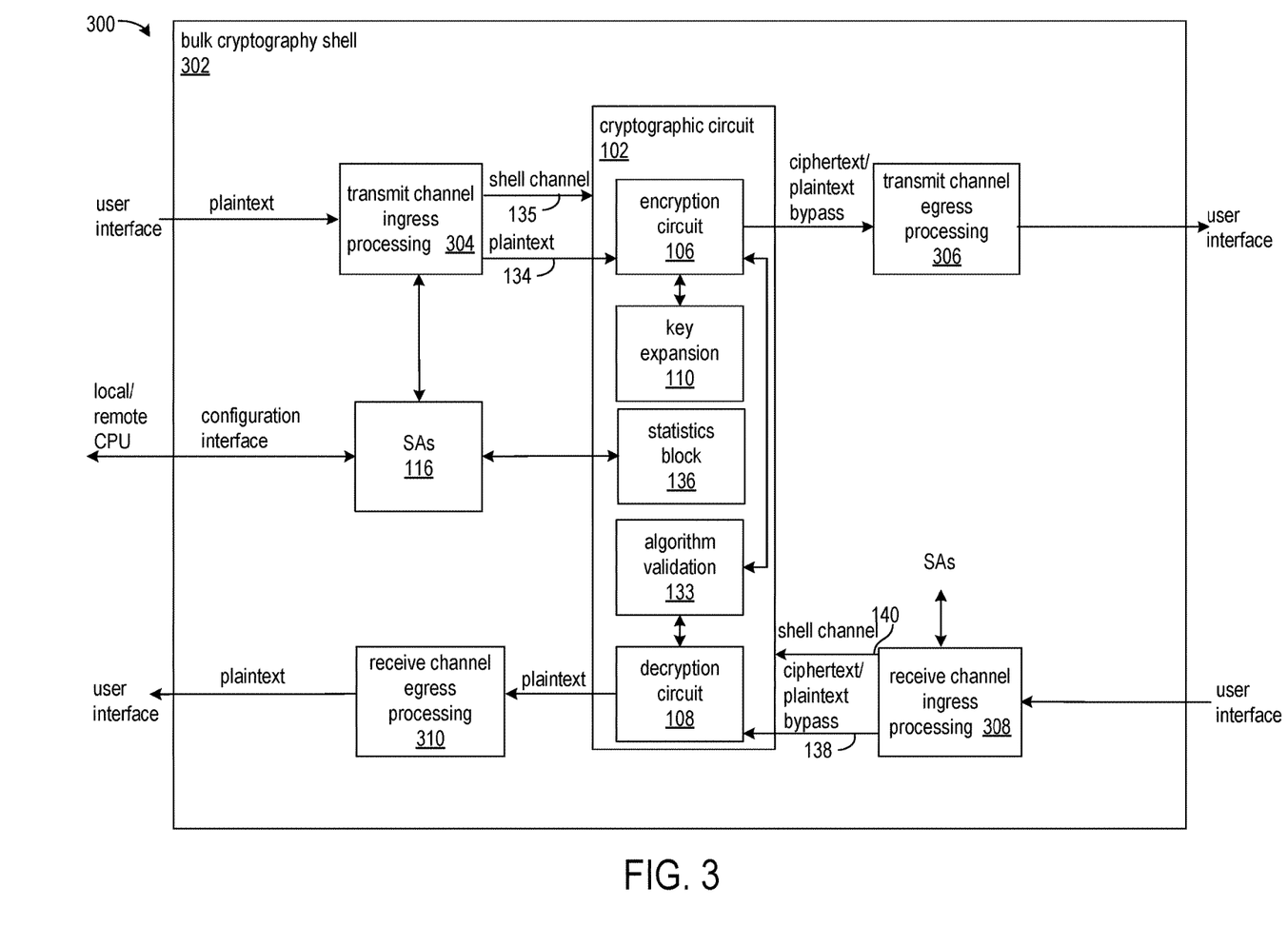
FIG. 3 shows a circuit arrangement according to an exemplary implementation for a bulk cryptography application.

FIG. 3 shows a circuit arrangement 300 according to an exemplary implementation for a bulk cryptography application. The circuit arrangement 300 includes a bulk cryptography shell circuit 302 that provides input and output interfaces to cryptographic circuit 102. The cryptographic circuit includes the sub-circuits shown in FIG. 1 and described above.

The bulk cryptography shell circuit 302 implements parallel transmit and receive channels, supporting concurrent encryption and decryption activities. The transmit channel includes transmit channel ingress processing circuit 304 and transmit channel egress processing circuit 306. The transmit channel ingress processing circuit 304 receives plaintext data from a user interface and looks-up bulk cryptography attributes and parameters in the memory circuit 116, which associatively stores SAs in the reconfigurable shell and enables scalable support on larger SA numbers.

The user interface that provide input to and receives output from the bulk cryptography shell 302 can be any application-specific circuitry connected to the input and output signal lines of the bulk cryptography shell. For example, the user interface can be circuitry implemented in programmable logic for moving plaintext or encrypted data. Alternatively, a DMA controller can be connected to the input or output of the bulk cryptography shell.

As the bulk cryptography shell is a minimal shell suitable for application-specific interfaces, the look-up of an SA index in the memory 116 can be based on the input plaintext or on other application-specific criteria.

The information retrieved from the memory 116 can include the SA index, cipher select, cipher-specific parameters, and bulk cryptography-specific parameters. The cipher-select parameter can indicate AES-GCM-128b, AES- GCM-256b, or another cipher suite. Cipher-specific parameters can include nonce, initialization vector, etc.

The transmit channel ingress processing circuit 304 inputs plaintext data to the encryption circuit 106 on signal lines 134 and shell channel data on signal lines 135. The shell channel data includes the SA index, cipher-select parameter, and cipher-specific parameters. The encryption circuit encrypts the plaintext data according to the cipher-select parameter and cipher-specific parameters and outputs the ciphertext to the transmit channel egress processing circuit 306.

The transmit channel egress processing circuit 306 can insert new metadata in the packet, replace the current metadata, insert any packet that bypasses the encryption block into the data stream, or perform other transformations on the packet that are unrelated to bulk cryptography.

Output data from the transmit channel egress processing circuit 306 is provided to a user interface. The egress user interface can be the same as or different from the ingress user interface depending the application.

The receive channel includes receive channel ingress processing circuit 308 and receive channel egress processing circuit 310. The receive channel ingress processing circuit 308 receives ciphertext data via a user interface and looks up the attributes and parameters in the memory circuit 116.

The receive channel ingress processing circuit 308 inputs ciphertext data to the decryption circuit 108 on signal lines 138 and shell channel data on signal lines 140. The shell channel data includes the SA index, cipher-select parameter, and cipher-specific parameters. The decryption circuit decrypts the ciphertext data according to the cipher-select parameter and cipher-specific parameters and outputs the plaintext data to the receive channel egress processing circuit 310.

The receive channel egress processing circuit 310 can perform the same function(s) as egress processing circuit 306.

Output data from the receive channel egress processing circuit 310 is provided to the user interface.

Figure 4:
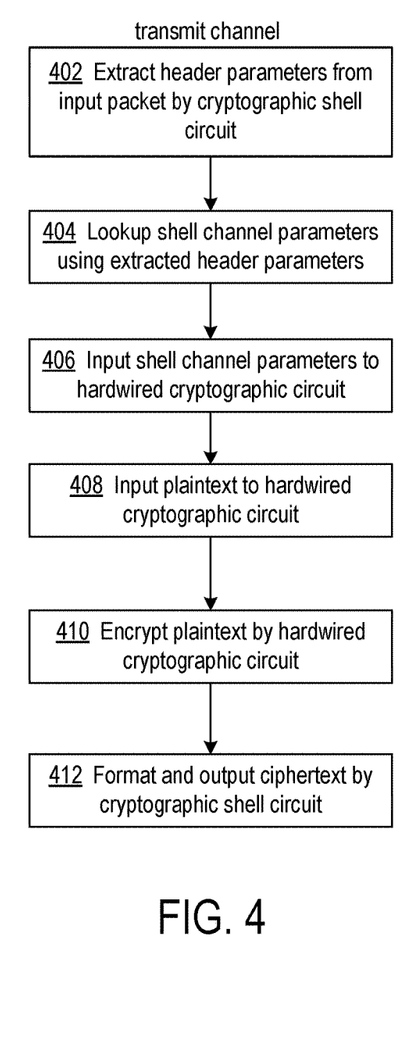
FIG. 4 is a flowchart of an exemplary process performed within a transmit channel according to one or more implementations.

FIG. 4 is a flowchart of an exemplary process performed within a transmit channel according to one or more implementations. At block 402, in response to input of plaintext data to a cryptographic shell circuit, the cryptographic shell circuit extracts parameters from the input data, such as a packet in some protocols. The extracted parameters can depend on the security scheme employed by the application. For example, the extracted parameters can be for MACsec, IPsec, or bulk cryptography implementations.

At block 404, the cryptographic shell circuit looks-up shell channel parameters associated with the extracted parameters in a memory circuit. The shell channel parameters can include, depending on the security application, SA index, a cipher select parameter indicating AES-GCM-128b, AES-GCM-256b, or another cipher suite and cipher-specific parameters including nonce, initialization vector, the packet number, security channel number, sequence number, security parameter index (SPI) etc.

The hardwired cryptographic circuit can be employed in various security applications, such as MACsec, IPsec, or bulk cryptography as indicated above. The cryptograph shell circuit can be implemented in programmable logic or as a processor executing software and can be configured according to the desired security application. As such, the hardwired cryptographic circuit has separate sets of signal lines for input of the shell channel parameters and plaintext. The shell channel parameters are input to the hardwired cryptographic circuit at block 406 on one set of signal lines, and the plaintext is input to the hardwired cryptographic circuit at block 408 on another set of signal lines.

At block 410, the hardwired cryptographic circuit encrypts the plaintext according to the input shell channel parameters. The ciphertext is output by the cryptographic shell circuit according to the security application at block 412.

Figure 5:
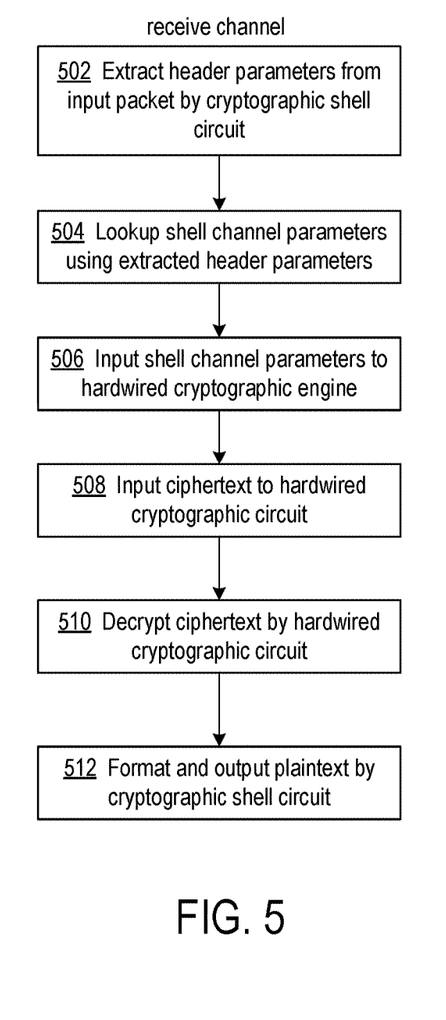
FIG. 5 is a flowchart of an exemplary process performed within a receive channel according to one or more implementations.

FIG. 5 is a flowchart of an exemplary process performed within a receive channel according to one or more implementations. At block 502, in response to input of data containing ciphertext to a cryptographic shell circuit, the cryptographic shell circuit extracts parameters from the input data. The input data can be in packet format in some protocols. The extracted parameters can depend on the security scheme employed by the application. For example, the extracted parameters can be for MACsec, IPsec, or bulk cryptography implementations.

At block 504, the cryptographic shell circuit looks-up shell channel parameters associated with the extracted parameters in a memory circuit, as described above in regards to the process of the transmit channel.

The hardwired cryptographic circuit has separate sets of signal lines for input of the shell channel parameters and ciphertext. The shell channel parameters are input to the hardwired cryptographic circuit at block 506 on one set of signal lines, and the ciphertext is input to the hardwired cryptographic circuit at block 508 on another set of signal lines.

At block 510, the hardwired cryptographic circuit decrypts the ciphertext according to the input shell channel parameters. The resulting plaintext is output by the cryptographic shell circuit according to the security application at block 512.

Figure 6:
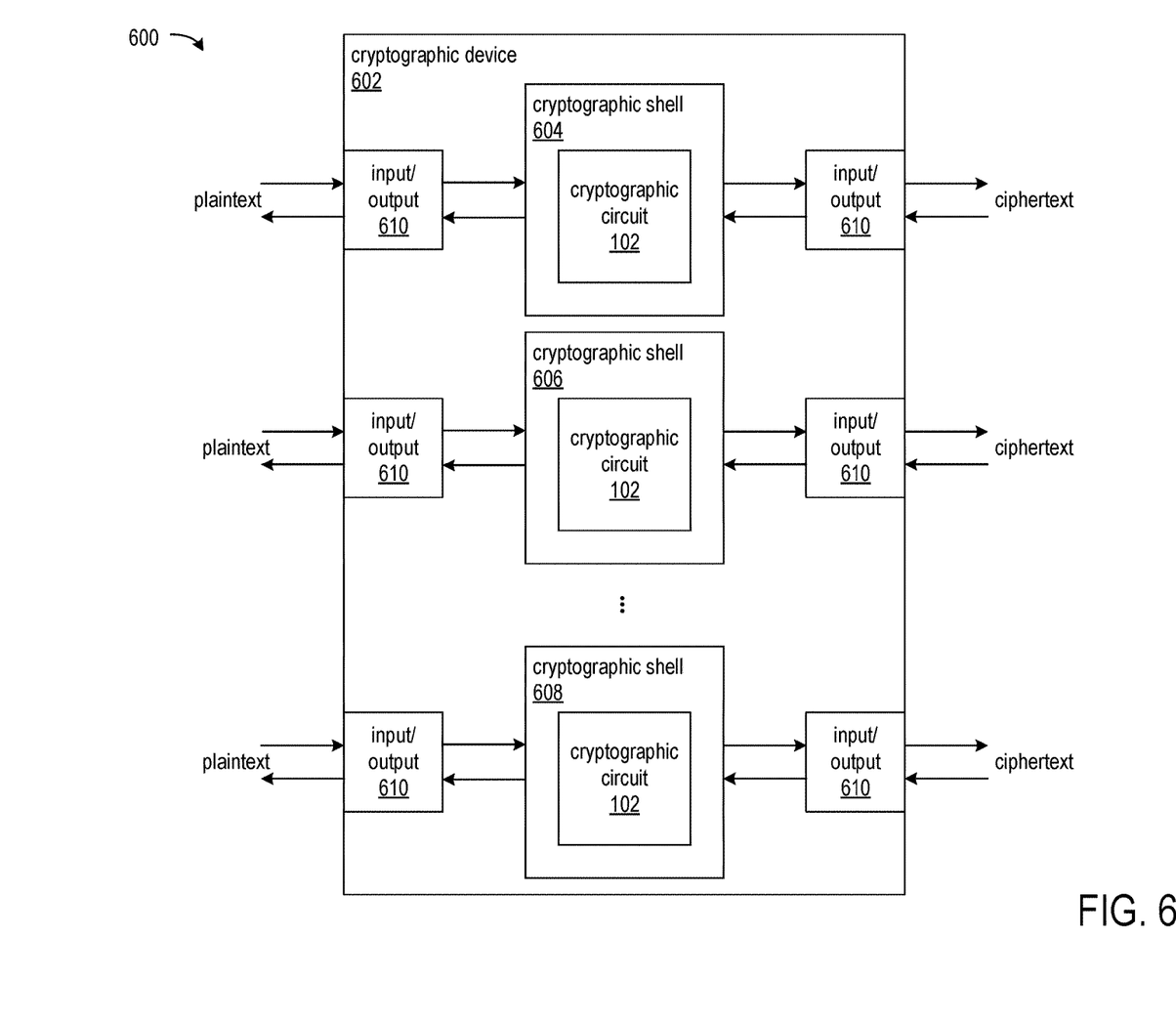
FIG. 6 shows a circuit arrangement having multiple reconfigurable cryptographic shell circuits and associated hardwired cryptographic circuits.

FIG. 6 shows a circuit arrangement 600 having multiple reconfigurable cryptographic shell circuits and associated hardwired cryptographic circuits. The reconfigurable cryptographic shell circuits are shown as blocks 604, 606, . . . 608, and each of the reconfigurable cryptographic shell circuits has a dedicated instance of the hardwired cryptographic circuit 102. The reconfigurable cryptographic shell circuits can be instances of the MACsec shell circuit 104, IPsec shell circuit 202, bulk cryptography shell circuit 302 and/or a cryptographic shell circuit for any other comparable security protocol.

The circuit arrangement can provide encryption and decryption functions for multiple, different security applications. Thus, a single device can service multiple endpoints, each requiring a different cryptographic application. For example, a single device can provide MACsec, IPsec, and/or bulk cryptographic functions. The reconfigurability of the cryptographic shell circuits 604, 606, . . . , 608 allows resources to be redirected to different cryptographic security applications as processing needs change. For example, the programmable resources that once implemented a MACsec cryptographic shell circuit can be reprogrammed to implement an IPsec cryptographic shell circuit if needed. Also, multiple instances of the same cryptographic shell circuit can be configured to satisfy bandwidth requirements for a particular security application.

The cryptographic device 602 can be an integrated circuit (IC) package, for example. Each of the cryptographic shell circuits 604, 606, . . . , 608 is coupled to at least one instance of input/output circuitry 610. Each input/output circuit can be a high-speed serial transceiver that sends data to destinations and receives data from sources external to the device 602. In some implementations, the source or destination of the plaintext or ciphertext can be circuitry implemented on the same IC chip or package as the cryptographic device 602, and the cryptographic shell circuit can be coupled to the on-chip/package source/destination via a bus or programmable routing resources of the device instead of being coupled to an input/output circuit 610.

Figure 7:
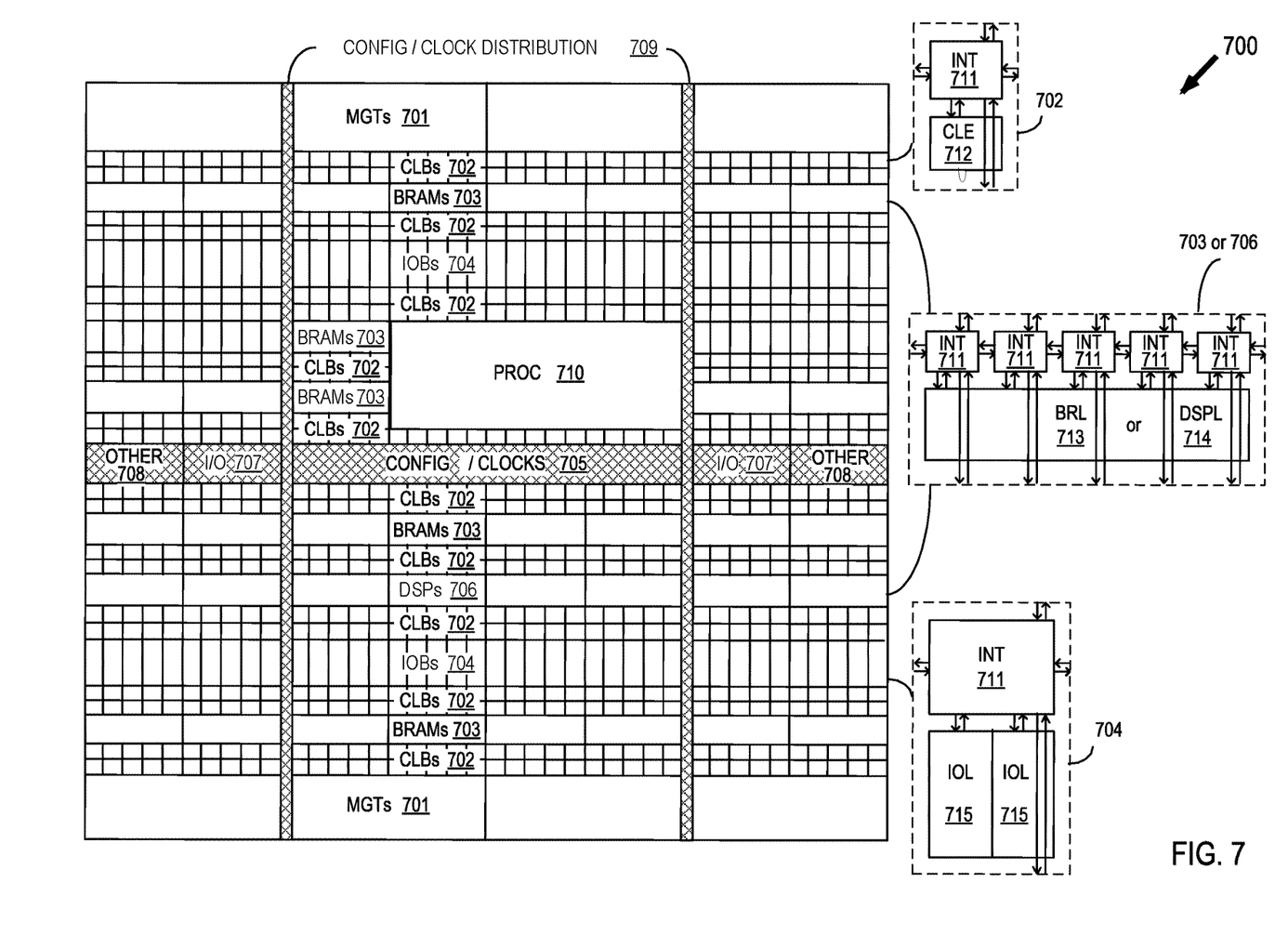
FIG. 7 shows a programmable integrated circuit (IC) on which the disclosed circuits and processes can be implemented.

FIG. 7 shows a programmable integrated circuit (IC) 700 on which the disclosed circuits and processes can be implemented. The programmable IC may also be referred to as a System On Chip (SOC) that includes field programmable gate array logic (FPGA) along with other programmable resources. FPGA logic may include several different types of programmable logic blocks in the array. For example, FIG. 7 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 7) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 7 include additional logic blocks that disrupt the regular columnar structure making up a large part of the programmable IC. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual programmable IC, more than one adjacent column of CLBs is typically included wherever the CLBs appear, to facilitate the efficient implementation of user logic.

Various modules may be implemented to carry out one or more of the operations and activities described herein and/or shown in the figures. In these contexts, a "module," "engine," or "block" is a circuit that carries out one or more of these or related operations/activities (e.g., encryption and/or decryption). For example, one or more modules/engines are discrete logic circuits or programmable logic circuits configured and arranged for implementing these operations/activities, as shown in FIGS. 1-3 and 6. The programmable circuit can include one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for encryption and/or decryption. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
an encryption circuit;
a decryption circuit; and
a cryptographic shell circuit having a transmit channel and a receive channel in parallel with the transmit channel, wherein:
the transmit channel includes an encryption interface circuit coupled to the encryption circuit and the encryption interface circuit is configured to determine first cryptographic parameters based on data in a plaintext input packet and input the first cryptographic parameters and plaintext input packet to the encryption circuit, wherein the first cryptographic parameters and the data in the plaintext input packet are provided to the encryption circuit on physically separate signal lines;
the receive channel includes a decryption interface circuit coupled to the decryption circuit, and the decryption interface circuit is configured to determine second cryptographic parameters based on data in a ciphertext input packet and input the second cryptographic parameters and ciphertext input packet to the decryption circuit, wherein the second cryptographic parameters and the data in the ciphertext input packet are provided to the decryption circuit on physically separate signal lines;

the encryption circuit is configured to encrypt the plaintext input packet based on the first cryptographic parameters; and the decryption circuit is configured to decrypt the ciphertext input packet based on the second cryptographic parameters.

2. The circuit arrangement of claim 1, wherein the cryptographic shell circuit is implemented in programmable logic circuitry.

3. The circuit arrangement of claim 1, wherein the cryptographic shell circuit includes a processor configured to execute instructions that cause the processor to determine the first cryptographic parameters and the second cryptographic parameters.

4. The circuit arrangement of claim 1, wherein the cryptographic shell circuit includes a memory circuit configured with a plurality of security associations that specify the first cryptographic parameters and the second cryptographic parameters.

5. The circuit arrangement of claim 1, wherein the cryptographic shell circuit implements media access control security.

6. The circuit arrangement of claim 1, wherein the cryptographic shell circuit implements internet protocol security.

7. The circuit arrangement of claim 1, wherein the cryptographic shell circuit implements bulk encryption and bulk decryption.

8. The circuit arrangement of claim 1, wherein the first cryptographic parameters and the second cryptographic parameters include a cipher selection code and an initialization vector.

9. The circuit arrangement of claim 1, wherein:

the transmit channel includes a first set of signal lines that carry the first cryptographic parameters from the encryption interface circuit to the encryption circuit, and a second set of signal lines that are physically separate from the first set of signal lines and that carry the data in the plaintext input packet to the encryption circuit; and the receive channel includes a third set of signal lines that carry the second cryptographic parameters from the decryption interface circuit to the decryption circuit, and a fourth set of signal lines that are physically separate from the third set of signal lines and that carry data of the ciphertext input packet to the decryption circuit.

10. The circuit arrangement of claim 9, wherein the cryptographic shell circuit and first and second sets of signal lines are implemented in programmable logic circuitry.

11. A circuit arrangement comprising:

an integrated circuit (IC) device;

a plurality of pairs of encryption circuits and decryption circuits disposed on the IC device;

a plurality of cryptographic shell circuits coupled to the plurality of pairs of encryption circuits and decryption circuits, respectively, each cryptographic shell circuit having a transmit channel and a receive channel in parallel with the transmit channel, wherein:

the transmit channel includes an encryption interface circuit coupled to the encryption circuit of one of the pairs, and the encryption interface circuit is configured to determine first cryptographic parameters based on data in a plaintext input packet and input the first cryptographic parameters and plaintext input packet to the encryption circuit, wherein the first cryptographic parameters and the data in the plaintext input packet are provided to the encryption circuit on physically separate signal lines;

the receive channel includes a decryption interface circuit coupled to the decryption circuit of the one of the pairs, and the decryption interface circuit is configured to determine second cryptographic parameters based on data in a ciphertext input packet and input the second cryptographic parameters and ciphertext input packet to the decryption circuit, wherein the second cryptographic parameters and the data in the ciphertext input packet are provided to the decryption circuit on physically separate signal lines;

the encryption circuit of the one of the pairs is configured to encrypt the plaintext input packet based on the first cryptographic parameters; and the decryption circuit of the one of the pairs is configured to decrypt the ciphertext input packet based on the second cryptographic parameters.

12. The circuit arrangement of claim 11, wherein the plurality of cryptographic shell circuits implement one of media access control security, internet protocol security, or bulk cryptography.

13. The circuit arrangement of claim 11, wherein one or more of the plurality of cryptographic shell circuits implements media access control security, and one more of the plurality of cryptographic shell circuits implements internet protocol security.

14. The circuit arrangement of claim 11, wherein one or more of the plurality of cryptographic shell circuits implements media access control security, one more of the plurality of cryptographic shell circuits implements internet protocol security, and one more of the plurality of cryptographic shell circuits implements bulk cryptography.

15. The circuit arrangement of claim 11, wherein the plurality of cryptographic shell circuits are implemented in programmable logic circuitry.

16. The circuit arrangement of claim 11, wherein the plurality of cryptographic shell circuits include one or more processors configured to execute instructions that cause the one or more processors to determine the first cryptographic parameters and the second cryptographic parameters.

17. The circuit arrangement of claim 11, wherein each cryptographic shell circuit of the plurality of cryptographic shell circuits includes a memory circuit configured with a plurality of security associations that specify the first cryptographic parameters and the second cryptographic parameters.

18. The circuit arrangement of claim 11, wherein the first cryptographic parameters and the second cryptographic parameters include a cipher selection code and an initialization vector.

19. The circuit arrangement of claim 11, wherein:

the transmit channel includes a first set of signal lines that carry the first cryptographic parameters from the encryption interface circuit to the encryption circuit, and a second set of signal lines that are physically separate from the first set of signal lines and that carry data of the plaintext input packet to the encryption circuit; and the receive channel includes a third set of signal lines that carry the second cryptographic parameters from the decryption interface circuit to the decryption circuit, and a fourth set of signal lines that are physically separate from the third set of signal lines and that carry data of the ciphertext input packet to the decryption circuit.

20. The circuit arrangement of claim 18, wherein the plurality of cryptographic shell circuits and first and second sets of signal lines are implemented in programmable logic circuitry.

\* \* \* \* \*